United States Patent
Chen

(10) Patent No.: US 11,051,493 B2
(45) Date of Patent: Jul. 6, 2021

(54) METHOD AND SYSTEM FOR DISTINGUISHING IDENTITIES BASED ON NOSE PRINTS OF ANIMALS

(71) Applicant: Council of Agriculture, Taipei (TW)

(72) Inventor: Ching Han Chen, Taipei (TW)

(73) Assignee: Council of Agriculture, Taipei (TW)

( * ) Notice: Subject to any disclaimer, the term of this patent is extended or adjusted under 35 U.S.C. 154(b) by 58 days.

(21) Appl. No.: 16/565,246

(22) Filed: Sep. 9, 2019

(65) Prior Publication Data
US 2021/0068371 A1    Mar. 11, 2021

(51) Int. Cl.
*A01K 29/00*    (2006.01)
*G06K 9/46*    (2006.01)
*G06K 9/00*    (2006.01)
*A01K 11/00*    (2006.01)

(52) U.S. Cl.
CPC .......... *A01K 29/005* (2013.01); *A01K 11/006* (2013.01); *G06K 9/00362* (2013.01); *G06K 9/4604* (2013.01)

(58) Field of Classification Search
None
See application file for complete search history.

(56) References Cited

U.S. PATENT DOCUMENTS

| 2013/0108119 A1* | 5/2013 | Ptucha | G06F 16/583 382/110 |
| 2013/0322699 A1* | 12/2013 | Spicola, Sr. | G01G 9/00 382/110 |
| 2016/0110383 A1* | 4/2016 | Mowry | G06F 16/583 707/758 |
| 2017/0196196 A1* | 7/2017 | Trottier | A01K 5/0283 |
| 2018/0165838 A1* | 6/2018 | Ganesh | G08G 1/16 |
| 2019/0080160 A1* | 3/2019 | Wee | A61B 5/702 |

FOREIGN PATENT DOCUMENTS

| CN | 108171274 A | * | 6/2018 |
| CN | 109173263 A | * | 1/2019 |
| CN | 109191486 A | * | 1/2019 |

\* cited by examiner

Primary Examiner — Mohammed Rachedine

(57) ABSTRACT

A system for distinguishing identities based on nose prints of animals contains: an input end, a database, an identification unit, and an output end. The input end is configured to input image data. The database includes multiple animal identity data which are actual nose prints data, actual body information, actual face data, and identity information of the animals. The identification unit is electrically connected with the input end, the database, and an output end. The identification unit includes multiple identification programs configured to analyze the image data, thus obtaining compared nose prints data, compared body information, and compared face data of the animals. The compared nose prints data, the compared body information, and the compared face data of the animals are compared with the actual nose prints data, the actual body information, and the actual face data of the animal identity data respectively.

12 Claims, 11 Drawing Sheets

METHOD AND SYSTEM FOR DISTINGUISHING IDENTITIES BASED ON NOSE PRINTS OF ANIMALS

FIELD OF THE INVENTION

The present invention relates to a method and a system for distinguishing identities which judge whether the image data of the animals matches with the animal identity data of the animals.

BACKGROUND OF THE INVENTION

Conventional microchips are implanted into pets, but they do not have a unified specification to cause management difficult.

The present invention has arisen to mitigate and/or obviate the afore-described disadvantages.

SUMMARY OF THE INVENTION

The primary aspect of the present invention is to provide a method and a system for distinguishing identities based on nose prints of animals which are capable of enhancing identification accuracy greatly.

To obtain above-mentioned aspect, a system for distinguishing identities based on nose prints of animals provided by the present invention contains: an input end, a database, an identification unit, and an output end.

The input end is configured to input image data.

The database includes multiple animal identity data which are actual nose prints data, actual body information, actual face data, and identity information of the animals.

The identification unit is electrically connected with the input end, the database, and an output end. The identification unit includes multiple identification programs configured to analyze the image data, thus obtaining compared nose prints data, compared body information, and compared face data of the animals.

The compared nose prints data, the compared body information, and the compared face data of the animals are compared with the actual nose prints data, the actual body information, and the actual face data of the animal identity data respectively so as to distinguish whether the compared nose prints data, the compared body information, and the compared face data of the animals match with the animal identity data, thus obtaining distinguishing results and sending the distinguishing results to the output unit so that the output unit outputs the distinguishing results.

To obtain above-mentioned aspect, a method for distinguishing identities based on nose prints of animals contains steps of:

(A). inputting image data;

(B). analyzing the image data to acquire compared nose prints data, compared body information, and compared face data;

(C). selecting one of multiple animal identity data from a database, wherein the one animal identity data is actual nose prints data, actual body information, and actual face data of the animals, wherein the actual nose prints data, the actual body information, and the actual face data of the animals are compared with the compared nose prints data, the compared body information, and the compared face information respectively so as to distinguish whether the compared nose prints data, the compared body information, and the compared face data of the animals match with the animal identity data, thus obtaining distinguishing results and sending the distinguishing results to an output unit; and (D). outputting the distinguishing results by using the output unit.

DETAILED DESCRIPTION OF THE PREFERRED EMBODIMENTS

Figure 1:
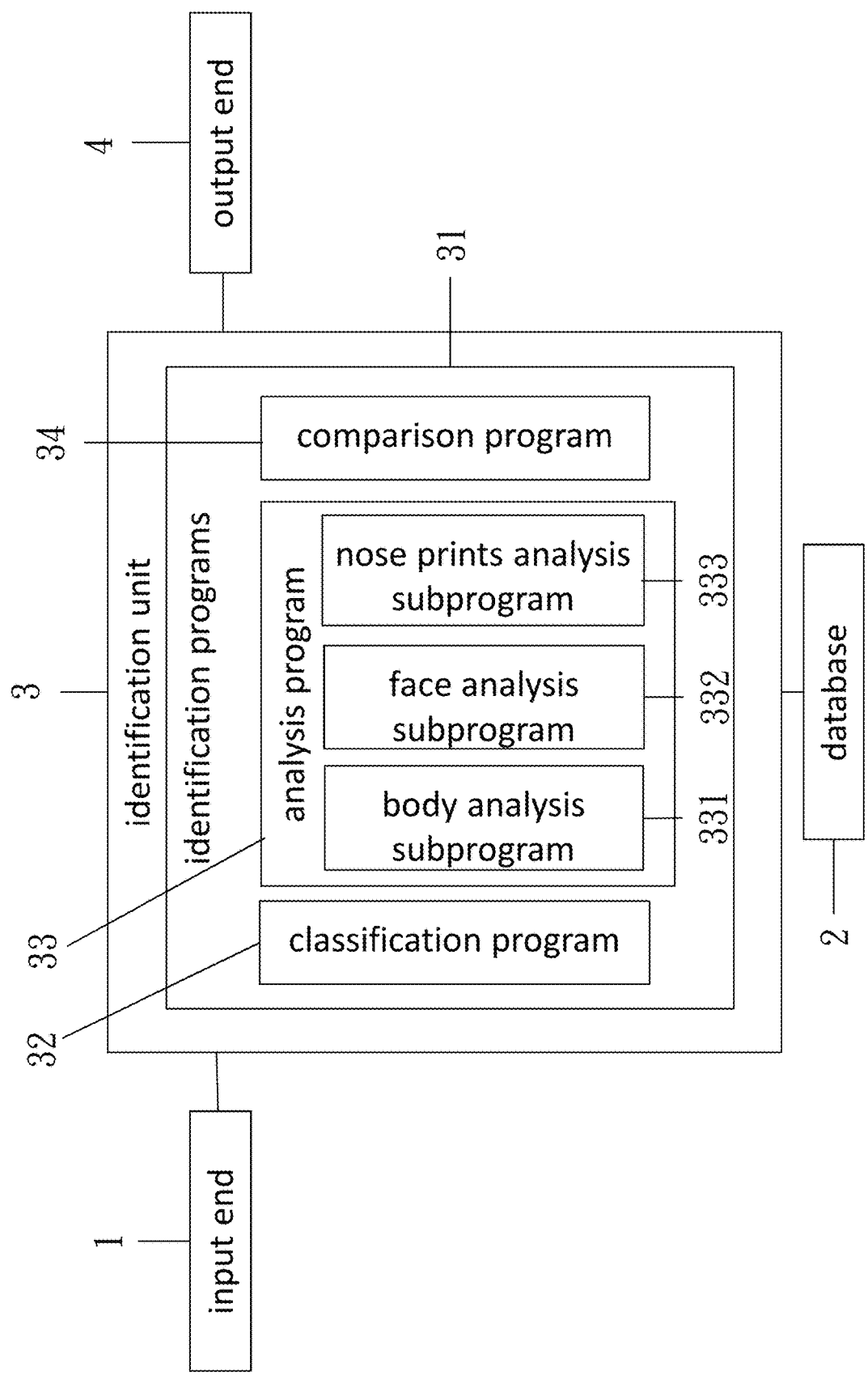
FIG. 1 is a schematic view showing a system for distinguishing identities based on nose prints of animals according to a preferred embodiment of the present invention.

FIG. 1, a system for distinguishing identities based on nose prints of animals according to the present invention comprises: an input end 1, a database 2, an identification unit 3, and an output end 4.

The input end 1 is configured to input image data (such as films or pictures) of the animals, wherein the image data includes the films or pictures which are multiple elevational views of the animals, such as a front elevational view of the animals, a rear elevational view of the animals, a left side elevational view of the animals, a right side elevational view of the animals, and a top plan view of the animals, so as to enhance identification accuracy. The input end 1 includes a three-dimensional (3D) image scanning unit configured to scan the animals, thus producing the image data of the animals.

The database 2 includes multiple animal identity data (such as pet identity data and stray animal data), wherein the pet identity data and the stray animal data are actual nose prints data, actual body information, actual face data, and identity information of the animals. The identity information of the animals includes names, genders, habitats, health statuses, owner information.

The identification unit 3 is electrically connected with the input end 1, the database 2, and the output end 4, wherein the identification unit 3 includes multiple identification programs 31 configured to analyze the image data, thus obtaining compared nose prints data, compared body information, and compared face data of the animals. Then, the compared nose prints data, the compared body information, and the compared face data of the animals are compared with the actual nose prints data, the actual body information, and the actual face data of the animal identity data respectively so as to distinguish whether the compared nose prints data, the compared body information, and the compared face data of the animals match with the animal identity data, thus obtaining distinguishing results and sending the distinguishing results to the output unit 4. Thereafter, the output unit 4 outputs the distinguishing results.

Figure 2:
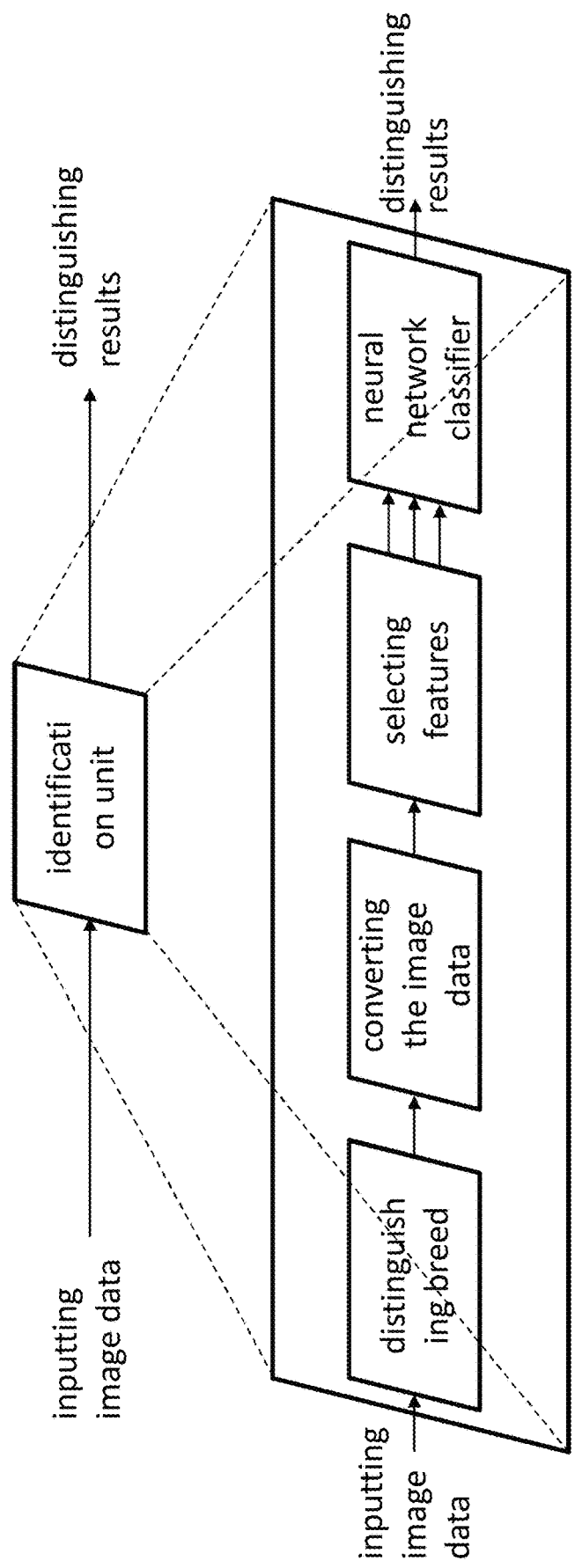
FIG. 2 is a schematic view showing the operation of the system for distinguishing identities based on the nose prints of the animals according to the preferred embodiment of the present invention.
Figure 3:
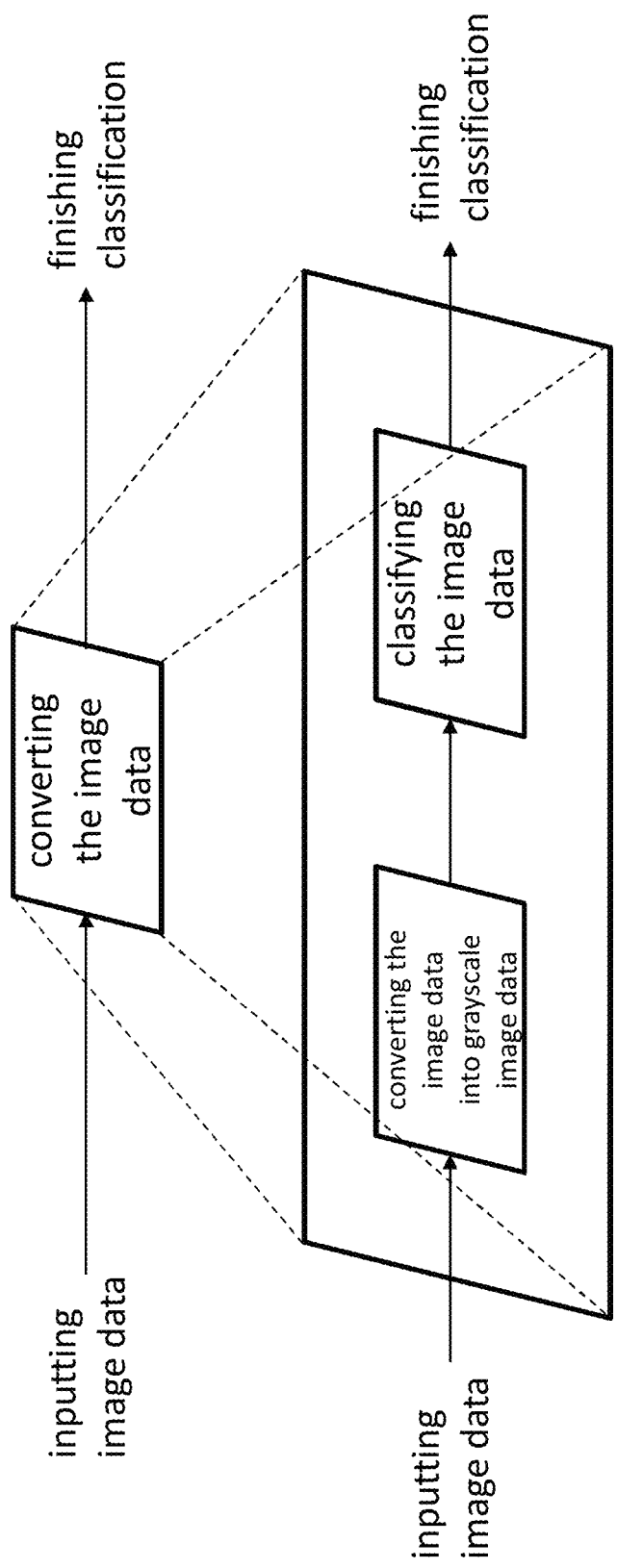
FIG. 3 is another schematic view showing the operation of the system for distinguishing identities based on the nose prints of the animals according to the preferred embodiment of the present invention.
Figure 4:
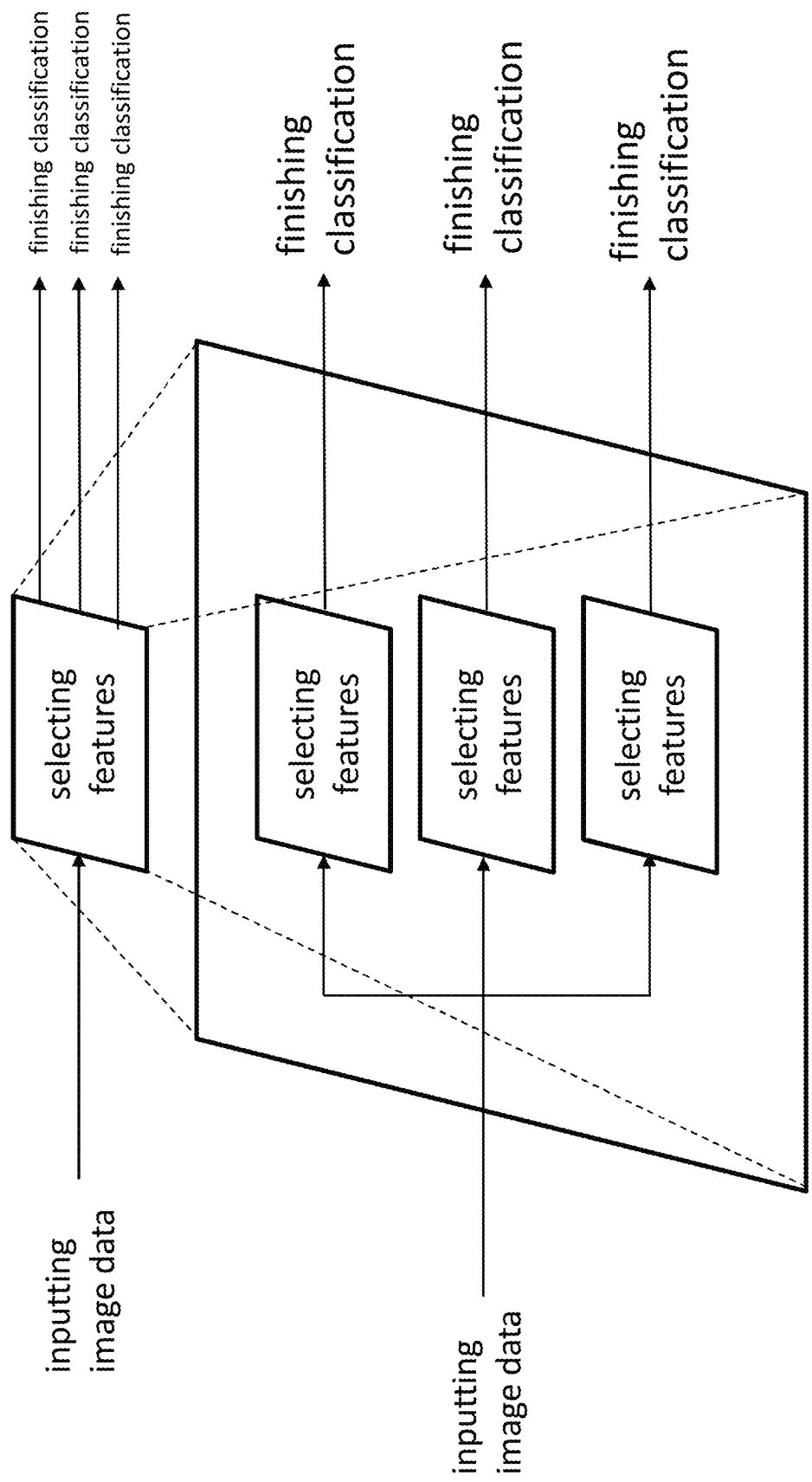
FIG. 4 is also another schematic view showing the operation of the system for distinguishing identities based on the nose prints of the animals according to the preferred embodiment of the present invention.
Figure 5:
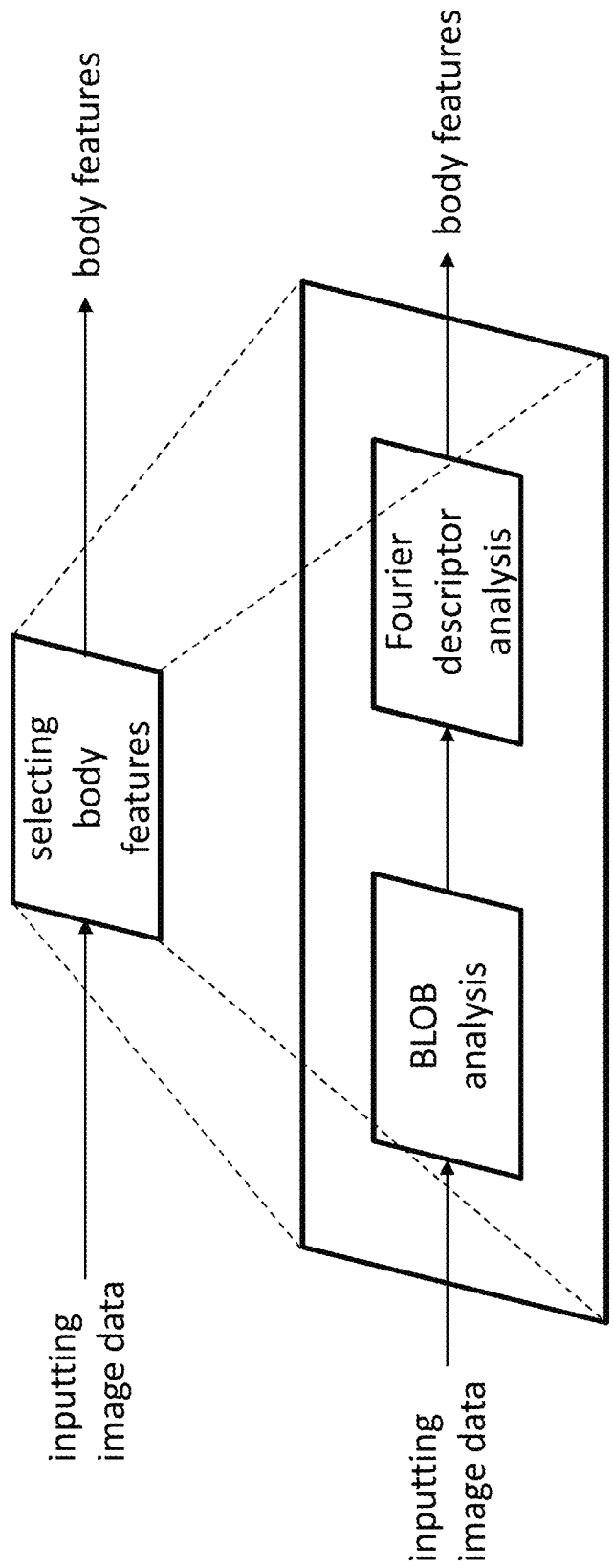
FIG. 5 is still another schematic view showing the operation of the system for distinguishing identities based on the nose prints of the animals according to the preferred embodiment of the present invention.

Referring to FIGS. 1 to 3, a method for distinguishing the identities based on nose prints of the animals (such as dogs) comprises steps of:

classifying the animals by using the multiple identification programs 31 after the input end 1 inputs the input image data of the dogs, wherein the multiple identification programs 31 include a classification program 32 and an analysis program 33, the classification program 32 is configured to convert the image data (such as RGB image data) into grayscale image data, and the grayscale image data is classified to nose prints classification data, body classification data, and face classification data. The analysis program 33 is configured to analyze the compared nose prints data, the compared body information, and the compared face data based on the nose prints classification data, the body classification data, and the face classification data respectively.

As shown in FIGS. 1, 2, 4 and 5, the identification unit 3 selects features (such as face features, body features, and nose prints features) of the animals so as to compare with the actual nose prints data, the actual body information, and the actual face data of the animals respectively. The analysis program 33 includes a body analysis subprogram 331 configured to analyze the body classification data by using Blob analysis and Fourier descriptor analysis so as to select body contour features (i.e., 10 characteristic values), thus acquiring the compared body information.

Figure 6:
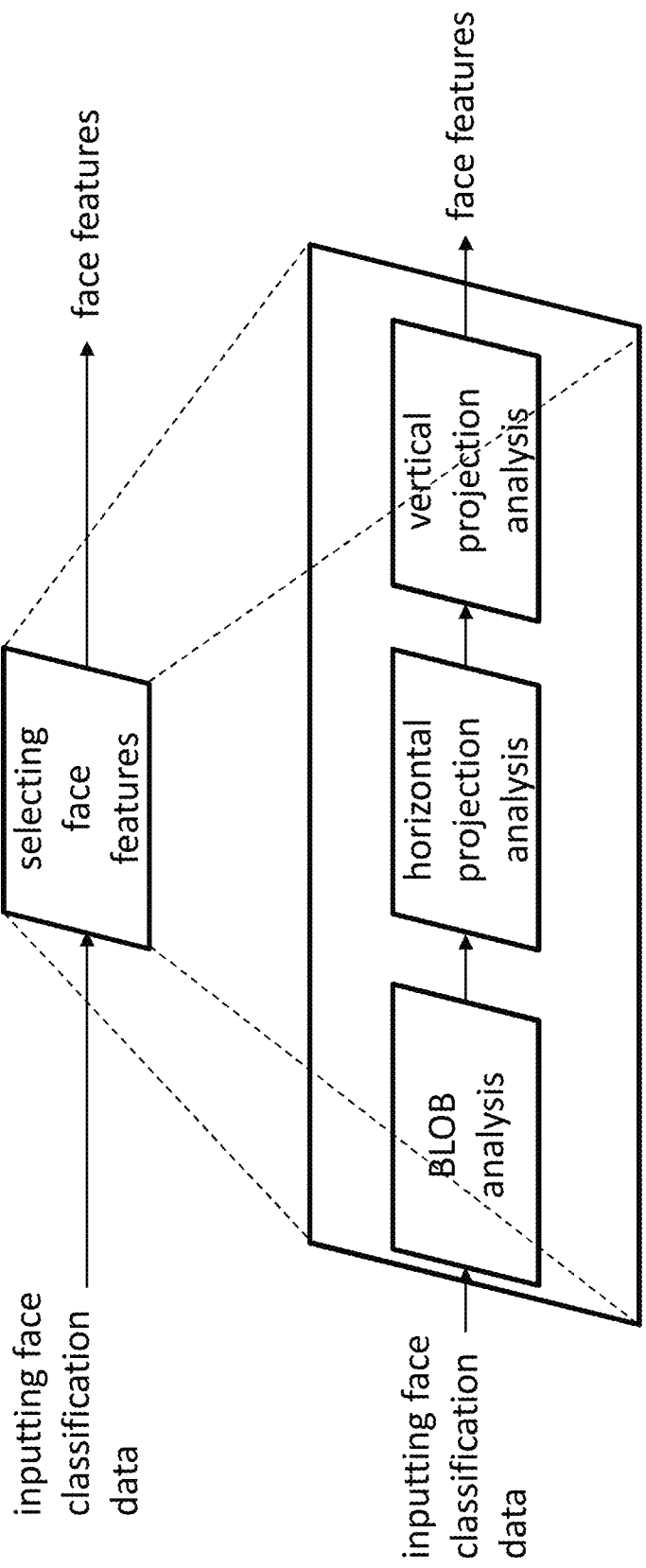
FIG. 6 is another schematic view showing the operation of the system for distinguishing identities based on the nose prints of the animals according to the preferred embodiment of the present invention.

As illustrated in FIGS. 1, 2, and 6, the analysis program 33 includes a face analysis subprogram 332 configured to analyze the face classification data by using the Blob analysis so as to acquire the compared face information, wherein the face analysis subprogram 332 is configured to execute a horizontal projection analysis and a vertical projection analysis so as to acquire horizontal projection features and vertical projection features, and each of the horizontal projection features and the vertical projection features has 64 characteristic values so that horizontal pixel and vertical pixel in the face classification data are added up to increase identifiable feature and to reduce data volume greatly.

Figure 7:
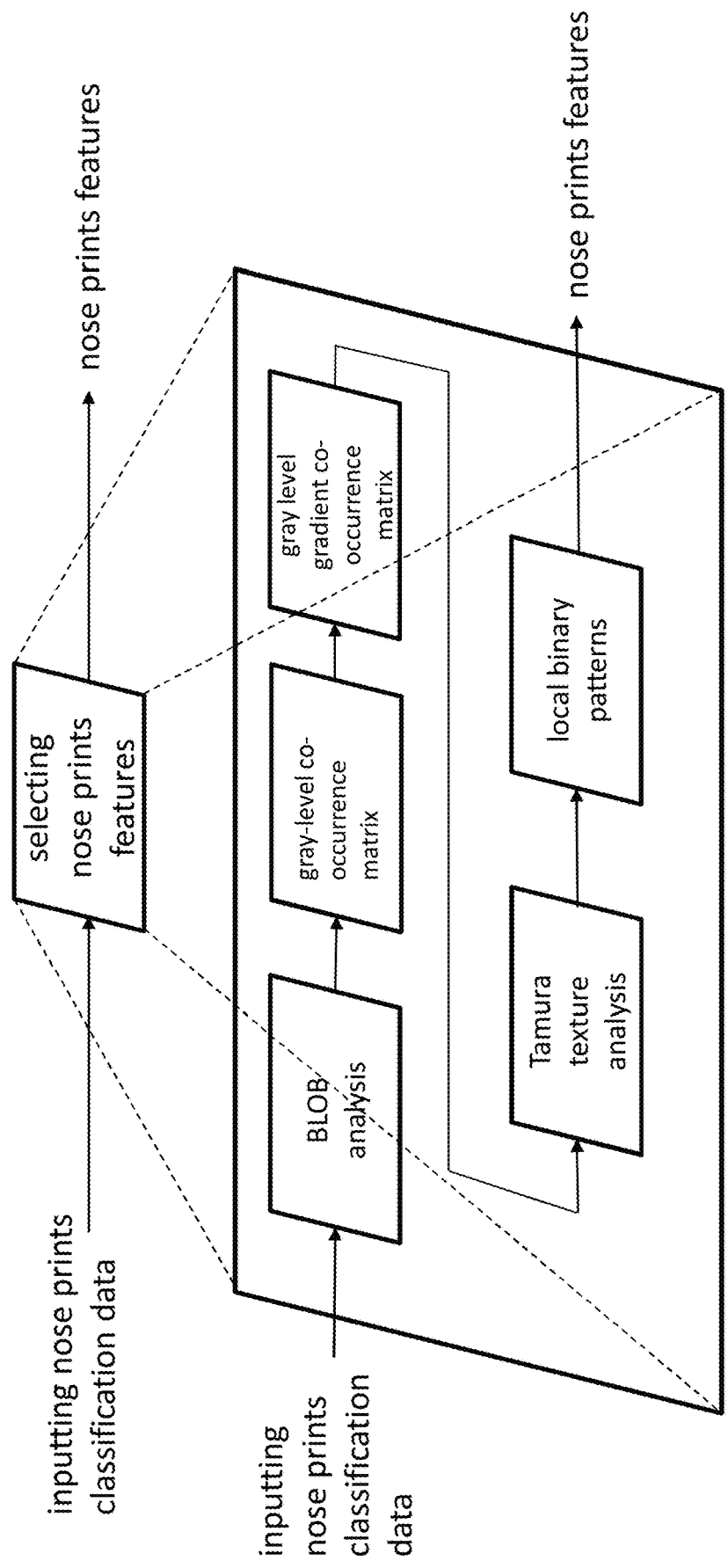
FIG. 7 is also another schematic view showing the operation of the system for distinguishing identities based on the nose prints of the animals according to the preferred embodiment of the present invention.

With reference to FIGS. 1, 2, and 7, the analysis program 33 further includes a nose prints analysis subprogram 333 configured to find out nose blocks by using the Blob analysis and to analyze the nose blocks by gray-level co-occurrence matrix (GLCM) so as to select 10 features which are energy, contrast, entropy, dissimilarity, homogeneity, mean, variance, and maximum, wherein each of the energy, the contrast, the entropy, the dissimilarity, the homogeneity, the mean, the variance, and the maximum has 24 characteristic values which are analyzed by using gray level gradient co-occurrence matrix (GLGCM) so as to select 15 characteristics which are small gradient advantage, large gradient advantage, inhomogeneity of gray distribution, inhomogeneity of gradient distribution, energy, gray level average, gradient average, gray-level mean square error, gradient mean square error, related, gray entropy, gradient entropy, mixed entropy, inertia, and inverse difference moment, wherein each of the small gradient advantage, the large gradient advantage, the inhomogeneity of gray distribution, the inhomogeneity of gradient distribution, the energy, gray level average, the gradient average, the gray-level mean square error, the gradient mean square error, the related, the gray entropy, the gradient entropy, the mixed entropy, the inertia, and the inverse difference moment has a characteristic value. Then, Tamura texture analysis is executed and has three features which are coarseness, directionality, and contrast, wherein each of the coarseness, directionality, and contrast has a characteristic value. Thereafter, 8 pixels and 16 pixels around the nose are analyzed by using local binary patterns, wherein each of the 8 pixels and 16 pixels around the nose has 24 characteristic values, thus obtaining compared nose prints data.

Figure 8:
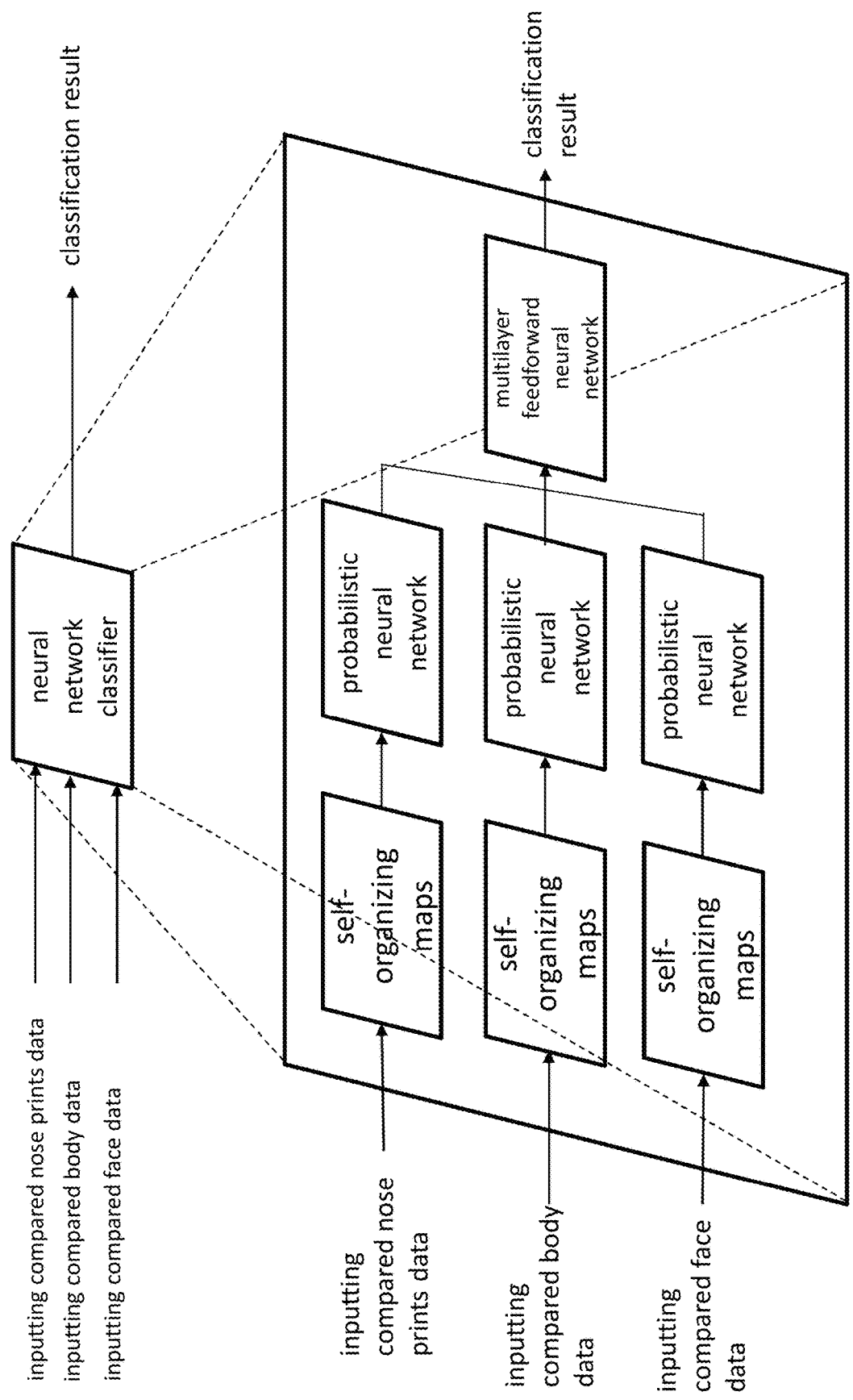
FIG. 8 is still another schematic view showing the operation of the system for distinguishing identities based on the nose prints of the animals according to the preferred embodiment of the present invention.

Referring to FIGS. 1, 2 and 8, the identification program 31 further includes a comparison program 34 configured to execute clustering analysis by using self-organizing maps (SOM) based on the compared nose prints data and the actual nose prints data of the animal identity data so as to acquire a first clustering result, and probabilistic neural network (PNN) analysis is executed according to the first clustering result so as to acquire a first probability analysis result. The comparison program 34 executes the clustering analysis by using self-organizing maps (SOM) based on the compared body information and the actual body information of the animal identity data so as to acquire a second clustering result, and the probabilistic neural network (PNN) analysis is executed according to the second clustering result so as to acquire a second probability analysis result. The comparison program 34 executes the clustering analysis by using self-organizing maps (SOM) based on the compared face data and the actual face data of the animal identity data so as to acquire a third clustering result, and the probabilistic neural network (PNN) analysis is executed according to the third clustering result so as to acquire a third probability analysis result. Finally, a multilayer feedforward neural network (MFNN) analysis is executed according to the first, second, and third probability analysis results so as to obtain animal identity data for matching with the image data.

When the first probability analysis result is less than a set value, the identification unit 3 judges whether the animal identity data are not logged in. When the animal identity data are not logged in, the identification unit 3 controls the output end 4 to output a unlogged message and produces new animal identity data according to the compared body information, the compared face data, and the compared nose prints data, thus archiving an animal identity.

As shown in FIGS. 1 and 2, the animal identity data further includes actual breed information, and the identification program 31 analyzes the image data to acquire compared breed information. Then, the compared nose prints data, the compared body information, the compared face data, and the compared breed information are compared with the actual nose prints data, the actual body information, the actual face data, and the actual breed information respectively to obtain a comparison result. Thereafter, the identification unit 3 judges whether the image data of the animals matches with the animal identity data of the animals. The compared breed information is analyzed by using convolutional neural network (CNN) of Google Inception V3.

Figure 9:
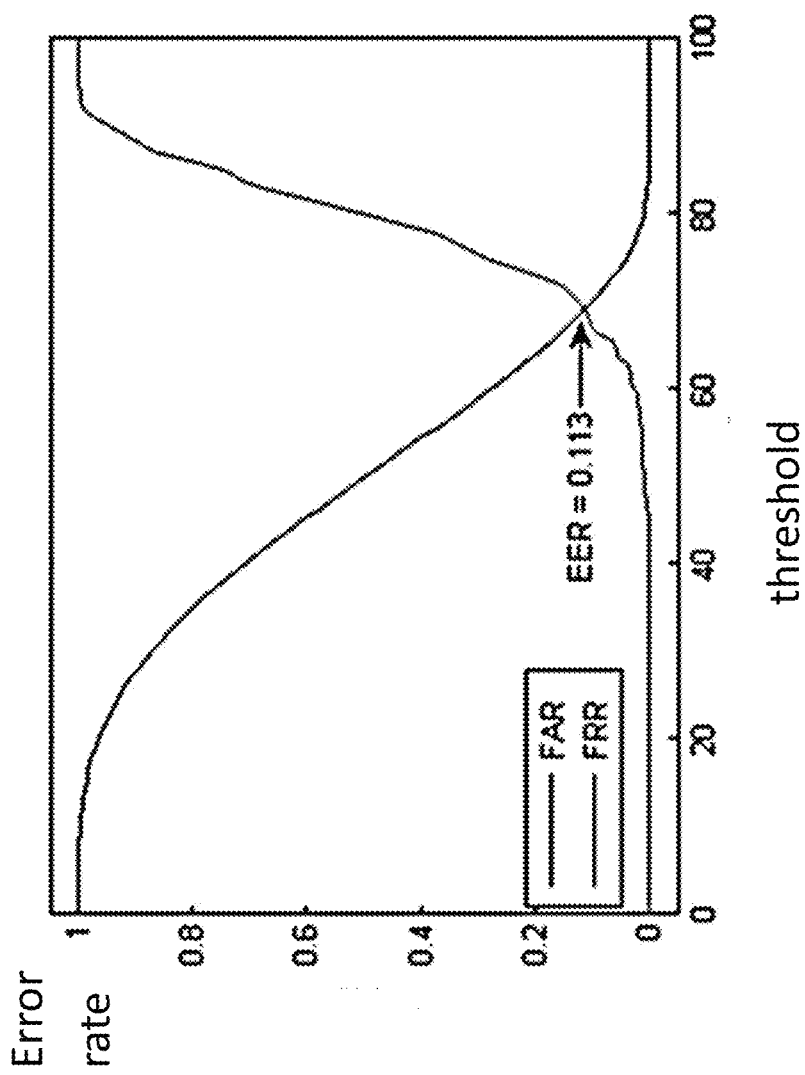
FIG. 9 is a diagram showing a distinguishing result by using convolutional neural network (CNN) of Google Inception V3.
Figure 10:
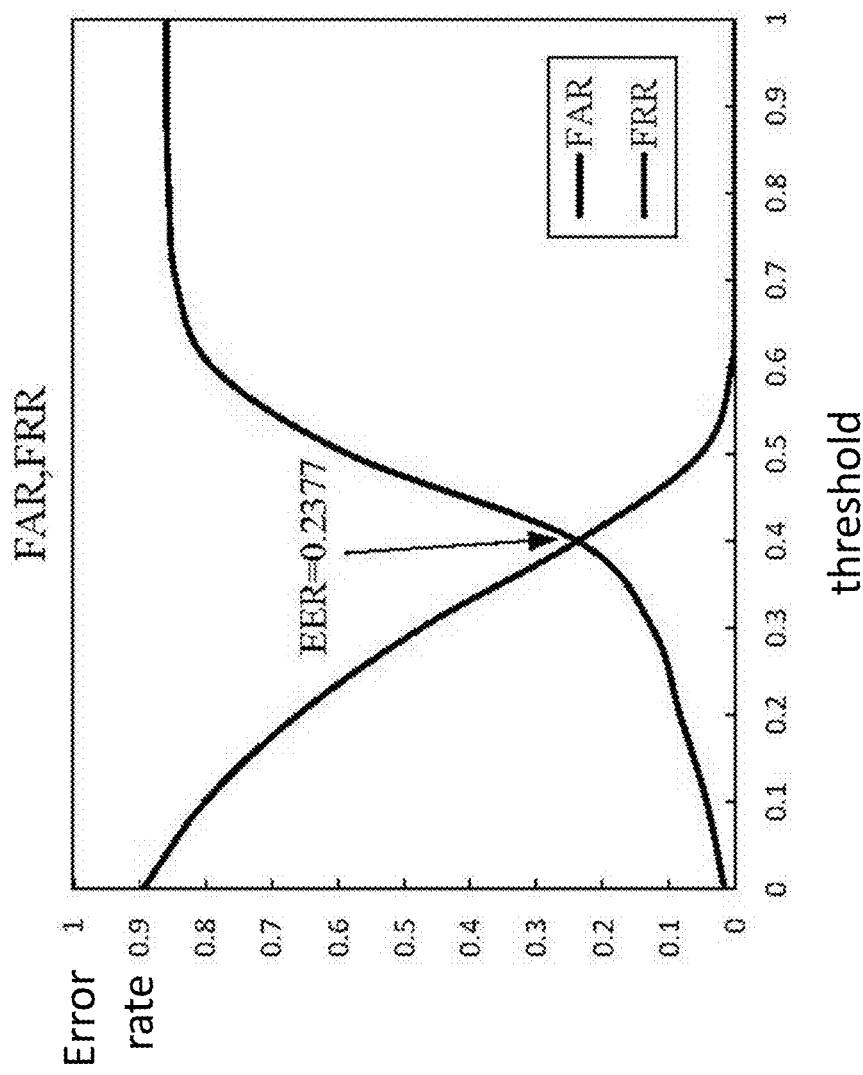
FIG. 10 shows an experimental result of the system according to the preferred embodiment of the present invention.
Figure 11:
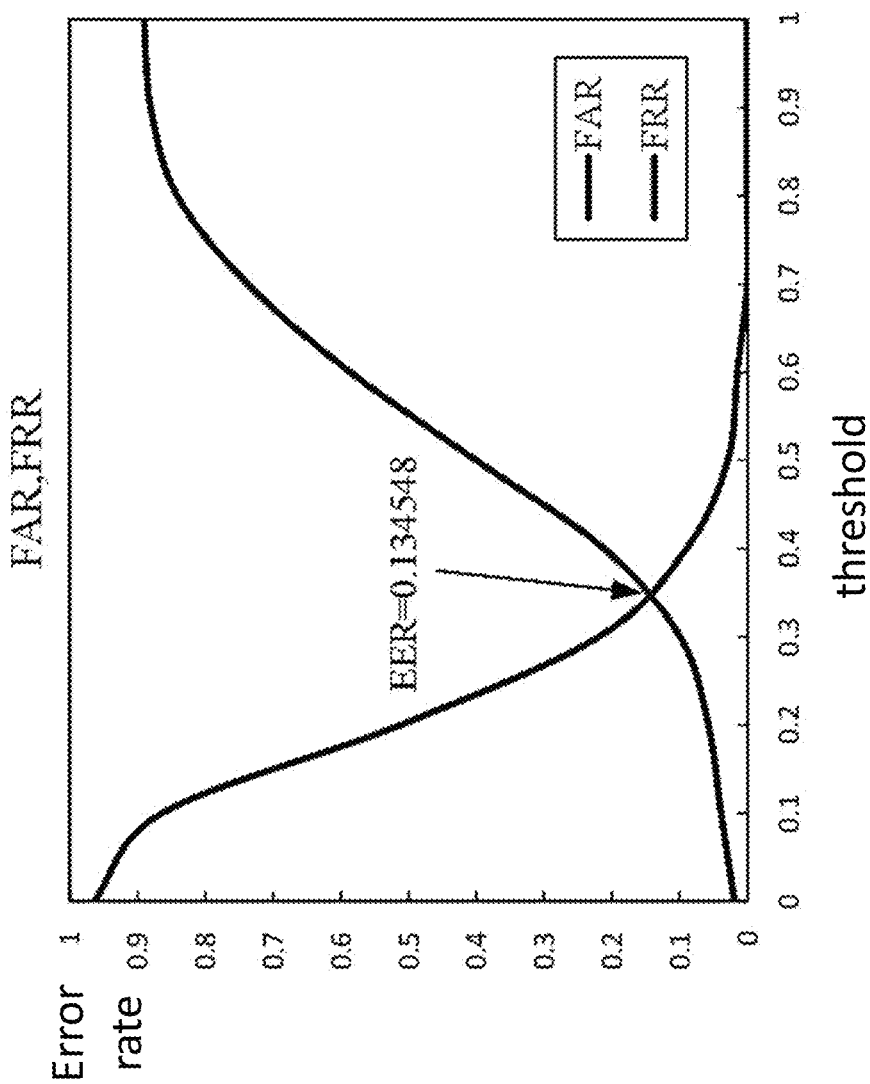
FIG. 11 shows another experimental result of the system according to the preferred embodiment of the present invention.

As illustrated in FIGS. 9-11, stray animals, home pets, wild animals are distinguished accurately by ways of the system of the present invention. To verify distinguishing effect of the present invention, we have an identification test with dogs, for example, taking 30 dogs for the identification test. In this test, 40 pictures, used as the image data, are taken to each dog, so there are 1200 pictures in this test, wherein half of the 1200 pictures are used to train the system of the present invention, and the other pictures are used for this test. With reference to FIG. 9, the compared breed information is analyzed by using the CNN of Google Inception V3, and an error rate of an analyzed result by using the CNN of Google Inception V3 is 23.77% because of similar appearances. So, the CNN of Google Inception V3 is not suitable to distinguish the dogs.

FIG. 10 shows an experimental result of the system of the present invention by using three features of the dogs, i.e., nose prints, faces, and bodies, wherein an error rate is 13.45% lower than that of the CNN. It is because the nose prints facilitate the distinguishing accuracy of the system of the present invention.

FIG. 11 shows an experimental result of the system of the present invention by using four features of the dogs, i.e., nose prints, faces, bodies, and classifications of dog breeds, wherein an error rate of the experimental result is 4.65%, thus obtaining accurate distinguishing effect without implanting microchips to the animals.

A method for distinguishing identities based on nose prints of animals according to the present invention comprises steps of:

(A). inputting image data;

(B). analyzing the image data to acquire compared nose prints data, compared body information, and compared face data;

(C). selecting one of multiple animal identity data from a database, wherein the one animal identity data is actual nose prints data, actual body information, and actual face data of the animals, wherein the actual nose prints data, the actual body information, and the actual face data of the animals are compared with the compared nose prints data, the compared body information, and the compared face information respectively so as to distinguish whether the compared nose prints data, the compared body information, and the compared face data of the animals match with the animal identity data of the animals;

(D). outputting distinguishing results by using an output unit.

To analyze the image data, in the step (B), the image data is converted into grayscale image data, and the grayscale image data is classified to nose prints classification data, body classification data, and face classification data, then the compared nose prints data, the compared body information, and the compared face data are analyzed based on the nose prints classification data, the body classification data, and the face classification data respectively.

To enhance identification accuracy, in the step (B), the body classification data is analyzed by using the Blob analysis and Fourier descriptor analysis so as to acquire the compared body information; then the face classification data is analyzed by using the Blob analysis, a horizontal projection analysis, and a vertical projection analysis so as to acquire the compared face information; thereafter, the nose prints classification data is analyzed by using Blob analysis, gray-level co-occurrence matrix (GLCM), gray level gradient co-occurrence matrix (GLGCM), Tamura texture analysis, and local binary patterns in succession so as to obtain the compared nose prints data.

To enhance identification accuracy, in the step (C), a clustering analysis is executed by using self-organizing maps (SOM) based on the compared nose prints data and the animal identity data so as to acquire a first clustering result, and probabilistic neural network (PNN) analysis is executed according to the first clustering result so as to acquire a first probability analysis result. Then, the clustering analysis is executed by using the self-organizing maps (SOM) based on the compared body information and the actual body information so as to acquire a second clustering result, and the probabilistic neural network (PNN) analysis is executed according to the second clustering result so as to acquire a second probability analysis result. Thereafter, the clustering analysis is executed by using the self-organizing maps (SOM) based on the compared face data and the actual face data so as to acquire a third clustering result, and the probabilistic neural network (PNN) analysis is executed according to the third clustering result so as to acquire a third probability analysis result. Finally, a multilayer feedforward neural network (MFNN) analysis is executed according to the first, second, and third probability analysis results so as to obtain animal identity data for matching with the image data.

Accordingly, compared breed information is acquired in the step (B) after analyzing the image data. In the step (C), the animal identity data further includes actual breed information. The actual nose prints data, the actual body information, the actual face data, and the actual breed information of the animal identity data are compared with the compared nose prints data, the compared body information, the compared face data, and the compared breed information respectively so as to obtain the comparison result. Thereafter, the identification unit 3 judges whether the image data of the animals matches with the animal identity data of the animals.

While the preferred embodiments of the invention have been set forth for the purpose of disclosure, modifications of the disclosed embodiments of the invention and other embodiments thereof may occur to those skilled in the art. Accordingly, the appended claims are intended to cover all embodiments which do not depart from the spirit and scope of the invention.

What is claimed is:

1. A system for distinguishing identities based on nose prints of animals comprising:
    an input end configured to input image data;
    a database including multiple animal identity data which are actual nose prints data, actual body information, actual face data, and identity information of the animals; and
    an identification unit electrically connected with the input end, the database, and an output end, wherein the identification unit includes multiple identification programs configured to analyze the image data, thus obtaining compared nose prints data, compared body information, and compared face data of the animals;
    wherein the multiple identification programs include a classification program and an analysis program, the classification program being configured to convert the image data into grayscale image data, and the grayscale image data is classified to nose prints classification data, body classification data, and face classification data;

wherein the analysis program includes a face analysis subprogram to analyze the face classification data by using a Blob analysis, a horizontal projection analysis, and a vertical projection analysis so as to acquire compared face data;

wherein the analysis program further includes a body analysis subprogram configured to analyze the body classification data by using the Blob analysis and a Fourier descriptor analysis so as to acquire the compared body information;

wherein the analysis program further includes a nose prints analysis subprogram configured to analyze the nose prints classification data by using the Blob analysis, a way of gray-level co-occurrence matrix (GLCM), a way of gray level gradient co-occurrence matrix (GLGCM), a Tamura texture analysis, and an analysis of local binary patterns in succession so as to obtain the compared nose prints data;

wherein the compared nose prints data, the compared body information, and the compared face data of the animals are compared with the actual nose prints data, the actual body information, and the actual face data of the animal identity data respectively so as to distinguish whether the compared nose prints data, the compared body information, and the compared face data of the animals match with the animal identity data, thus obtaining distinguishing results and sending the distinguishing results to the output unit so that the output unit outputs the distinguishing results.

2. The system as claimed in claim 1, wherein the identification program further includes a comparison program configured to execute clustering analysis by using self-organizing maps (SOM) based on the compared nose prints data and the actual nose prints data of the animal identity data so as to acquire a first clustering result, and probabilistic neural network (PNN) analysis is executed according to the first clustering result so as to acquire a first probability analysis result; the comparison program executes the clustering analysis by using self-organizing maps (SOM) based on the compared body information and the actual body information of the animal identity data so as to acquire a second clustering result, and the probabilistic neural network (PNN) analysis is executed according to the second clustering result so as to acquire a second probability analysis result; the comparison program executes the clustering analysis by using self-organizing maps (SOM) based on the compared face data and the actual face data of the animal identity data so as to acquire a third clustering result, and the probabilistic neural network (PNN) analysis is executed according to the third clustering result so as to acquire a third probability analysis result; finally, a multi-layer feedforward neural network (MFNN) analysis is executed according to the first, second, and third probability analysis results so as to obtain animal identity data for matching with the image data.

3. The system as claimed in claim 2, wherein when the first probability analysis result is less than a set value, the identification unit controls the output end to output a unlogged message and produces new animal identity data according to the compared body information, the compared face data, and the compared nose prints data, thus archiving an animal identity.

4. The system as claimed in claim 1, wherein the animal identity data further includes actual breed information; and the identification program analyzes the image data to acquire compared breed information; the compared nose prints data, the compared body information, the compared face data, and the compared breed information are compared with the actual nose prints data, the actual body information, the actual face data, and the actual breed information respectively to obtain a comparison result; the identification unit judges whether the image data of the animals matches with the animal identity data of the animals.

5. The system as claimed in claim 1, wherein the input end includes a three-dimensional (3D) image scanning unit configured to scan the animals, thus producing the image data of the animals.

6. The system as claimed in claim 1, wherein the image data includes a front elevational view of the animals, a rear elevational view of the animals, a left side elevational view of the animals, a right side elevational view of the animals, and a top plan view of the animals.

7. A method for distinguishing identities based on nose prints of animals comprising steps of:
(A) inputting image data;
(B) configuring a classification program to convert the image data into grayscale image data, and the grayscale image data being classified to nose prints classification data, body classification data, and face classification data;
(B1) configuring a face analysis subprogram configured to analyze the face classification data by using a Blob analysis, a horizontal projection analysis, and a vertical projection analysis so as to acquire compared face data;
(B2) configuring a body analysis subprogram to analyze the body classification data by using the Blob analysis and a Fourier descriptor analysis so as to acquire the compared body information;
(B3) configuring a nose prints analysis subprogram configured to analyze the nose prints classification data by using the Blob analysis, a gray-level co-occurrence matrix (GLCM), a gray level gradient co-occurrence matrix (GLGCM), a Tamura texture analysis, and an analysis of local binary patterns in succession so as to obtain the compared nose prints data;
(C) selecting one of multiple animal identity data from a database, wherein the one animal identity data is actual nose prints data, actual body information, and actual face data of the animals, wherein the actual nose prints data, the actual body information, and the actual face data of the animals are compared with the compared nose prints data, the compared body information, and the compared face information respectively so as to distinguish whether the compared nose prints data, the compared body information, and the compared face data of the animals match with the animal identity data, thus obtaining distinguishing results and sending the distinguishing results to an output unit; and
(D) outputting the distinguishing results by using the output unit.

8. The method as claimed in claim 7, wherein in the step (C), a clustering analysis is executed by using self-organizing maps (SOM) based on the compared nose prints data and the animal identity data so as to acquire a first clustering result, and probabilistic neural network (PNN) analysis is executed according to the first clustering result so as to acquire a first probability analysis result; subsequently, the clustering analysis is executed by using the self-organizing maps (SOM) based on the compared body information and the actual body information so as to acquire a second clustering result, and the probabilistic neural network (PNN)

analysis is executed according to the second clustering result so as to acquire a second probability analysis result; thereafter, the clustering analysis is executed by using the self-organizing maps (SOM) based on the compared face data and the actual face data so as to acquire a third clustering result, and the probabilistic neural network (PNN) analysis is executed according to the third clustering result so as to acquire a third probability analysis result; consequently, a multilayer feedforward neural network (MFNN) analysis is executed according to the first, second, and third probability analysis results so as to obtain animal identity data for matching with the image data.

9. The method as claimed in claim 8, wherein when the first probability analysis result is less than a set value, the identification unit controls the output end to output a unlogged message and produces new animal identity data according to the compared body information, the compared face data, and the compared nose prints data, thus archiving an animal identity.

10. The method as claimed in claim 7, further comprising a step of (B4) that is configured to generate a compared breed information after analyzing the image data; in the step (C), the animal identity data further includes actual breed information; the actual nose prints data, the actual body information, the actual face data, and the actual breed information of the animal identity data are compared with the compared nose prints data, the compared body information, the compared face data, and the compared breed information respectively so as to obtain the comparison result; the identification unit judges whether the image data of the animals matches with the animal identity data of the animals.

11. The method as claimed in claim 7, wherein in the step (A), the animals are scanned by a three-dimensional (3D) image scanning unit to produce the image data of the animals.

12. The method as claimed in claim 7, wherein in the step (A), the image data includes a front elevational view of the animals, a rear elevational view of the animals, a left side elevational view of the animals, a right side elevational view of the animals, and a top plan view of the animals.

* * * * *